Feb. 3, 1970          C. S. GODFREY                3,492,688
                APPARATUS FOR TENDERIZING FOOD
                    Filed June 16, 1966

INVENTOR.
CHARLES S. GODFREY
BY Samuel Lindenberg
   Arthur Friedlich
                ATTORNEYS

United States Patent Office 3,492,688
Patented Feb. 3, 1970

3,492,688
APPARATUS FOR TENDERIZING FOOD
Charles S. Godfrey, Berkeley, Calif., assignor to Physics International Company, San Leandro, Calif., a corporation, of California
Filed June 16, 1966, Ser. No. 557,938
Int. Cl. A22c *9/00, 7/00*
U.S. Cl. 17—25                                                 6 Claims

ABSTRACT OF THE DISCLOSURE

An article of food is tenderized by placing it in water and detonating an explosive charge in the vicinity thereof.

---

This invention relates to a method and means for tenderizing food, and more particularly to improvements therein.

---

A considerable amount of effort has been expended toward tenderizing food. Tenderizing is aimed at reducing the toughness found in many cuts of meat due to the hard fibers which are present in the meat and which, as a result, are not easily acted on by the application of heat. Meat has been tenderized mechanically by pounding with a hammer, or by the application of pressure pulses or acoustic waves while submerged in water. Chemical tenderization is also used whereby enzymes are applied to the meat. However, since this is a surface phenomena, it is only usable on thin cuts.

The present invention has for an object a novel and improved arrangement for tenderizing food.

Yet another object of the present invention is the provision of a method and means for enabling the simultaneous tenderization of a large number of articles of food.

These and other objects of the present invention are achieved by placing the food which is to be tenderized under water. A shock pressure wave is generated by any suitable means, such as by detonating a charge of high explosive underwater in the vicinity of the food to be tenderized. Because of the very large change of pressure across the shock front in a very short interval of time, the tissue structure of the food being treated breaks down and thus is tenderized.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

While a method of tenderizing food by submerging it in a tank of liquid and then applying high frequency mechanical vibrations to the liquid using an ultrasonic transducer, is shown, for example, in a patent to Simjian, No. 2,830,912, this technique has not found favor, in view of the fact that it does not really effectively tenderize the meat. The reason is that the structure shown does not apply a shock front pressure wave but rather applies pressure which gradually increases to a maximum and then drops off. It has been found in accordance with this invention that an article of food, such as meat, for example, is effectively tenderized, or has its tissue structure broken down, when a shock front pressure wave is applied to the meat.

The technique employed in accordance with this invention of generating and applying shock front pressure waves, operates by virtue of the fact that the compressive wave is generated in a manner so that it travels through the liquid medium at velocities exceeding the speed of sound. It is a well known characteristic of compressive waves traveling through a medium at velocities which exceed the speed of sound that the part of the wave at high pressure travels with a higher velocity than the part at lower pressure and thus within a short distance from the location at which the compressive wave was generated the wave has a very steep front which can be termed as the shock front. A very large change of pressure occurs across the shock front which is accompanied by a sudden change of the density, velocity, temperature, etc. The width of the shock front is usually assumed to be of molecular dimensions in a solid liquid.

Assuming a typical shock velocity of $5 \times 10^5$ centimeters per second, and a shock front width of 5 Angstroms ($5 \times 10^{-8}$ centimeters), the time in which the transition occurs is $10^{-13}$ seconds. It is this sudden change that breaks down the tissue structure and results in tenderization. An elastic wave, in which all parts of the wave are traveling at sound velocity, will not steepen up into a shock front and will not produce the results achieved with this invention.

Figure 1:
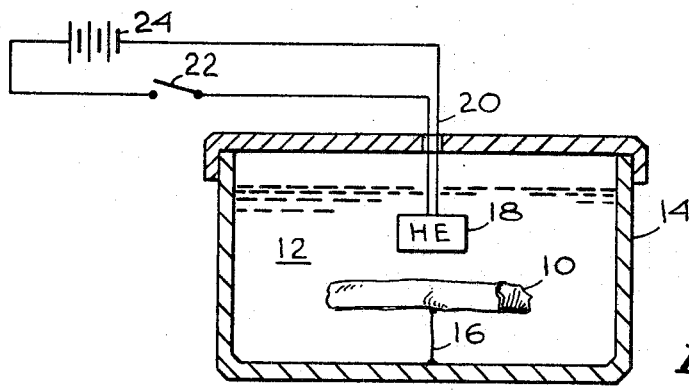
FIGURE 1 is a schematic representation of an embodiment of the invention.

Referring now to FIGURE 1, a cut of meat 10 desired to be tenderized is placed under water 12 within a tank 14. In view of the tendency of the meat to float, it may be necessary to tie the meat in position as by a string 16, having one end tied to the meat 10 and the other end tied to the bottom of the tank.

A compressive pressure wave traveling at a speed higher than the velocity of sound may be generated in the water by a means, such as a charge of high explosive 18, which is supported above the meat by any suitable means, such as the leads 20 which are used to ignite the detonator of the high explosive. The leads are connected through a switch 22 to a source of detonating potential 24.

Since the water is of substantially the same density as the meat, there is an excellent coupling of the shock wave to the meat by the water, there is no discontinuity problem, and no damage occurs to the meat. By way of example, and not to be construed as a limitation upon the invention, a one inch thick steak was placed one foot below a charge of explosive in a barrel of water and the explosive was one foot below the surface of the water. The explosive comprises 100 grams of composition C–4 which is $RD_x$ explosive with plasticizer, made by Du Pont. It was found that the meat was quite thoroughly tenderized.

It has been further found that the quantity of explosive required varies directly with the thickness of the meat. Also with the distance that the meat is placed from the explosive. Thus with a side of beef placed four feet away from the explosive charge, sixteen pounds of explosive were required. The meat may be prefrozen if desired. This improves the effectiveness of the tenderization process. In order to maintain the pressure gradient through the meat susbtantially constant, the thickness of the meat should preferably not exceed one-tenth of the distance from the explosive charge. Expressed alternatively, the meat should be at least ten times its thickness from the explosive charge.

The same quantity of explosive as is used to tenderize a single slice of meat 10 may also be employed for tenderizing a plurality of food articles or meat slices.

Figure 2:
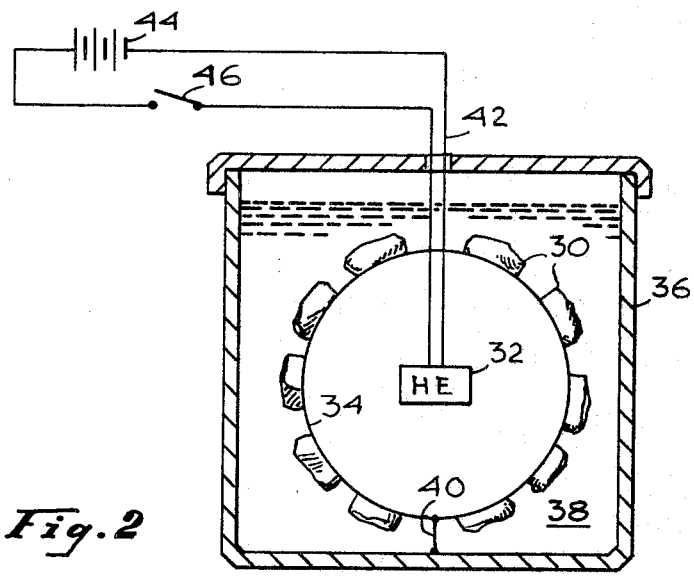
FIGURE 2 is a schematic representation showing how the embodiment of the invention is used to treat more than one portion of meat simultaneously.

This is seen in FIGURE 2 wherein the plurality of meat slices 30 are supported in a ring around the high explosive 32. Since the shock waves generated by the high explosive has a spherical wave front, the meat slices can be placed anywhere over the surface of an imaginary sphere, with the high explosive at its center.

In FIGURE 2 the meat is tied to a wire ring 34, which is supported above the bottom of the tank 36 filled with water 38, by a rod 40. In place of the wire ring 34 a spherical form made of wires or steel mesh may be employed to hold the slices of meat to be processed in position. A high explosive 32 is held in place by the wires 42, which are connected to the detonating potential source 44, through a switch 46. If the sphere has a diameter of two feet, and the meat being treated is one inch thick, the same amount of explosive as was used in illustration for FIGURE 1 may be used.

Figure 3:
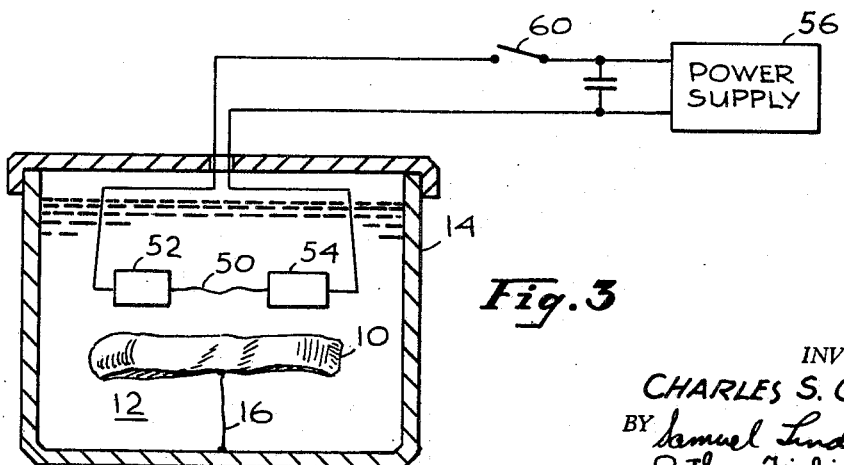
FIGURE 3 schematically illustrates still another arrangement for generating a shock pressure wave for tenderizing an article of food, in accordance with this invention.

FIGURE 3 illustrates an arrangement of an embodiment of the invention illustrating another arrangement for generating a shock pressure wave. Structures in FIGURE 3 which are similar to structures shown in FIGURE 1 have the same references numerals. The shock pressure wave generator comprises a thin wire 50, which is supported under water between two contacts 52, 54. A power supply 56 charges up a capacitor 58. When switch 60 is closed, the capacitor discharges a heavy current through the thin wire 50 whereby it explodes and generates a shock pressure which tenderizes the food article 10 spaced therefrom.

Since for the purpose of tenderization, substantially the same energy is released by the exploding wire, as by the explosive, substantially the same rules of spacing apply. For example, to tenderize a one-half inch thick slab of meat one foot away from a thin wire 50, which is 10 mils thick, the energy from 50 grams of high explosive amounting to about 250,000 joules is required. This is obtained by charging a bank of twenty parallel connected capacitors of 14.7 microfarads capacitance each from a 40,000 volt source. The capacitors are then discharged through the thin wire which explodes producing approximately 250,000 joules of energy.

While the meat or food being tenderized is shown as uncovered when under the water, it is to be understood that it is within the scope of this invention and its claims to place a protective wrapping around the food such as a flexible bag made of rubber or plastic material, from which the air has been evacuated. This is merely for the purpose of protecting the food from the water and does not prevent the shock wave from tenderizing the food.

There has been accordingly described and shown positioning said article of food within said liquid, exhereinabove a novel, useful method and means for tenderizing foods such as meat, using a shock pressure wave for applying the required pressure.

What is claimed is:
1. Apparatus for tenderizing an article of food comprising a container, a liquid filling said container, means positioning said articles of food within said liquid, explosive means, means positioning said explosive means beneath the surface of said liquid and adjacent to said article of food, and means for detonating said explosive means for generating a shock pressure wave within said liquid for tenderizing said article of food.
2. The structure recited in claim 1 wherein it is desired to tenderize a plurality of articles of food, and there is included means for positioning said plurality of articles of food dispersed over the surface of a sphere, said explosive means being positioned at the center of said sphere.
3. The structure recited in claim 1 wherein said article of food is a slab of meat, and the means positioning said explosive means adjacent to said article of food positions it a distance on the order of ten times the thicknes of said slab of meat.
4. The structure recited in claim 1 wherein said explosive means is a high explosive.
5. The structure recited in claim 1 wherein said explosive means is a wire.
6. The structure recited in claim 1 wherein there is a protective wrapping enclosing said article of food in a manner to evacuate the air therefrom.

References Cited

UNITED STATES PATENTS

| | | | |
|---|---|---|---|
| 2,703,297 | 3/1955 | MacLeod | 102—24 X |
| 2,880,663 | 4/1959 | Simjian | 17—25 X |
| 667,435 | 2/1901 | Friese-Greene et al. | |
| 2,806,246 | 9/1957 | Simjian | 17—25 |
| 3,062,574 | 11/1962 | Bunten Bach et al. | 102—46 X |
| 3,199,454 | 8/1965 | Hart | 43—4.5 X |

LUCIE H. LAUDENSLAGER, Primary Examiner

U.S. Cl. X.R.

17—45, 51; 99—107